(12) United States Patent
Laurenti et al.

(10) Patent No.: US 11,831,740 B2
(45) Date of Patent: *Nov. 28, 2023

(54) CLOUD GATEWAY FOR LEGACY COMPUTING DEVICES

(71) Applicant: AMADEUS S.A.S., Biot (FR)

(72) Inventors: Jean-Michel Laurenti, Antibes (FR); Jan Kelderman, Barneveld (NL)

(73) Assignee: AMADEUS S.A.S., Biot (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/054,675

(22) Filed: Nov. 11, 2022

(65) Prior Publication Data

US 2023/0076778 A1 Mar. 9, 2023

Related U.S. Application Data

(63) Continuation of application No. 16/928,533, filed on Jul. 14, 2020, now Pat. No. 11,503,138.

(30) Foreign Application Priority Data

Jul. 26, 2019 (FR) ..................................... 1908548

(51) Int. Cl.
*H04L 69/08* (2022.01)
*G06F 13/38* (2006.01)
(Continued)

(52) U.S. Cl.
CPC ............ *H04L 69/08* (2013.01); *G06F 13/385* (2013.01); *H04L 12/66* (2013.01);
(Continued)

(58) Field of Classification Search
CPC ..... H04L 69/08; H04L 12/66; H04L 67/1001; H04L 67/5681; H04L 69/322;
(Continued)

(56) References Cited

U.S. PATENT DOCUMENTS

| 6,230,194 | B1 | 5/2001 | Frailong et al. |
| 8,533,253 | B2 | 9/2013 | McCoy |

(Continued)

FOREIGN PATENT DOCUMENTS

| CN | 203734848 U | 7/2014 |
| EP | 2645636 A2 | 10/2013 |

(Continued)

OTHER PUBLICATIONS

U.S. Appl. No. 18/054,699, Cloud Gateway for Legacy Computing Devices, filed Nov. 11, 2022.

*Primary Examiner* — Tejis Daya
(74) *Attorney, Agent, or Firm* — Perry + Currier

(57) ABSTRACT

The document describes systems and methods for handling local (legacy) devices. A local cloud gateway comprises a plurality of interface connectors of different types to physically connect a plurality of these legacy devices to the cloud, comprising a plurality of distant servers. Developments describe the step of extracting the functional messages out of messages stemming from local legacy devices (e.g. protocol translators), secure communications, logical representations of legacy devices in the cloud ("twins"), administration options, various user interfaces (e.g. buzzer) for seamless configuration and use, the use of one or more actuators (retroactions on the physical world), etc. Software and/or hardware embodiments are described.

16 Claims, 4 Drawing Sheets

(51) Int. Cl.
*H04L 12/66* (2006.01)
*H04L 69/322* (2022.01)
*H04R 17/10* (2006.01)
*H04L 67/1001* (2022.01)
*H04L 67/5681* (2022.01)

(52) U.S. Cl.
CPC ...... *H04L 67/1001* (2022.05); *H04L 67/5681* (2022.05); *H04L 69/322* (2013.01); *H04R 17/10* (2013.01); *G06F 2213/0002* (2013.01)

(58) Field of Classification Search
CPC ........... G06F 13/385; G06F 2213/0002; G06F 9/5072; G06F 9/541; H04R 17/10
See application file for complete search history.

(56) References Cited

U.S. PATENT DOCUMENTS

| | | | |
|---|---|---|---|
| 9,231,904 | B2 | 1/2016 | Johnson et al. |
| 10,769,152 | B2 | 9/2020 | Huang et al. |
| 11,625,280 | B2 | 4/2023 | Anderson et al. |
| 2005/0171950 | A1 | 8/2005 | Dumitru et al. |
| 2013/0086140 | A1* | 4/2013 | Salsburg ................ G06F 9/541 709/203 |
| 2013/0179461 | A1 | 7/2013 | Sharma et al. |
| 2013/0212214 | A1 | 8/2013 | Lawson et al. |
| 2013/0290548 | A1 | 10/2013 | He |
| 2013/0316814 | A1* | 11/2013 | Griswold .............. G02F 1/1347 29/25.35 |
| 2013/0332208 | A1 | 12/2013 | Mehta |
| 2015/0071465 | A1* | 3/2015 | Zalisk .................... G08C 17/00 74/504 |
| 2017/0022015 | A1 | 1/2017 | Gollu |
| 2018/0000344 | A1* | 1/2018 | Melodia ................ H04W 84/18 |
| 2018/0063000 | A1 | 3/2018 | Wu et al. |
| 2018/0248827 | A1* | 8/2018 | Scharber ................ H04L 51/18 |
| 2018/0282098 | A1* | 10/2018 | Yamaya ................ B65H 18/26 |
| 2019/0081912 | A1 | 3/2019 | Cui et al. |
| 2019/0140926 | A1 | 5/2019 | Nayak et al. |
| 2021/0218571 | A1 | 7/2021 | Ansari et al. |

FOREIGN PATENT DOCUMENTS

| | | |
|---|---|---|
| EP | 3056993 A1 | 8/2016 |
| WO | WO-2016144694 A1 | 9/2016 |

* cited by examiner

CLOUD GATEWAY FOR LEGACY COMPUTING DEVICES

CROSS-REFERENCE TO RELATED APPLICATION

This application is a continuation of U.S. patent application Ser. No. 16/928,533, filed Jul. 14, 2020, which claims priority to French patent application no. 1908548, filed Jul. 26, 2019. The contents of the above-identified applications are incorporated herein by reference.

FIELD

This document relates to the field of electronic communications and more particularly to gateways for accessing networks, in the specific context of hotels.

BACKGROUND

The shift to the Cloud is to be seen in many industries, but some technical domains have to cope with legacy systems (inheritage of systems of the past, with no substitution possible). Therefore, significant adaptations have sometimes to be performed, leaving space for disruption.

In the travel industry, a hotelkeeper is using a so-called "Property Management System", acronym PMS, to manage his daily activities (check-in, check-out, etc). Such a system in fact interacts with a variety of local existing systems, hereinafter named legacy systems, which for example comprise keycard (reader/writer), point of sales telephony systems, Video-on-Demand systems, etc. New systems can be added, even proprietary ones.

Many of these local systems are old, but hotelkeepers (or their respective providers) are not planning to replace them. These devices are generally not able to communicate over the Internet. In addition, if applicable, each of these systems can be using his own communication protocol, via different connection interfaces. For example, RS232 serial interfaces can still be (intensely) used. Some systems can translate RS232 interfaces to TCP/IP, but they can require a significant amount of work, and maintenance. Some other systems present limitations. For example, using a Serial-to-IP device, allowing virtualization of serial connection, may imply the downstream use of virtual machines, which may hardly integrate with predefined cloud APIs offered in cloud platforms.

In addition, most of these legacy systems are unsecured (data traffic in clear, etc).

Nowadays, commercial offerings off-the-shelves by hotel technology providers, such as Digi or Comtrol, which aim at connecting existing legacy systems to a PMS (of whatever type), present limitations (if and when they just exist). For example, it is not possible to directly connect devices presenting RS232 interfaces to existing Cloud APIs.

SUMMARY

The document describes systems and methods for handling local (legacy) devices. A local cloud gateway comprises a plurality of interface connectors of different types to physically connect these legacy devices to the cloud, comprising a plurality of distant servers. Developments describe the step of extracting the functional messages out of messages stemming from local legacy devices (e.g. protocol translators), secure communications, logical representations of legacy devices in the cloud ("twins"), administration options, various user interfaces (e.g. buzzer) for seamless configuration and use, the use of one or more actuators (retroactions on the physical world), etc. Software and/or hardware embodiments are described.

Embodiments of the invention present numerous advantages.

User configuration is minimal and user-friendly. Deployment is simple, reduced at maximum. Integration is seamless. Users can focus on their core expertise. Hence, user adoption can be maximized.

Traffic can be secured downstream the cloud gateway client. Potential adverse eavesdropping for example would necessarily need to be local (i.e. it would require physical intervention upstream the cloud gateway).

Advantageously, per definition, cloud operated services are scalable. Services can be outsourced and remotely monitored and managed. In other words, management intelligence is deported into the Cloud, allowing for fast and verified upgrades or updates. Mutualisation of systems' management allows economies of scale and leads in the end to better services delivered locally.

Advantageously, in some embodiments, the box hardware is configurable, for example extendable (would new interface connectors be needed, it is possible to add new hardware mounted on the initial box).

Advantageously, the Cloud infrastructure can be fully agnostic on box hardware.

Advantageously, the integration of the new local device (and its associated protocol) can be done in a seamless manner: the data traffic is encapsulated and handled in the cloud, i.e. without any impact on boxes already deployed.

Advantageously, the global system comprising the box part and the cloud part are simple to deploy, easy to manage, transparent for the user and allows communications with any type of devices or protocols (even future ones). By construction the overall system is reliable. More generally, embodiments of the invention can be advantageous for other technical domains wherein there is a need to connect unsecure systems with cloud managed services.

BRIEF DESCRIPTIONS OF THE DRAWINGS

Embodiments of the invention will now be described by way of example with reference to the accompanying drawings in which like references denote similar elements, and in which.

DETAILED DESCRIPTION

Figure 1:
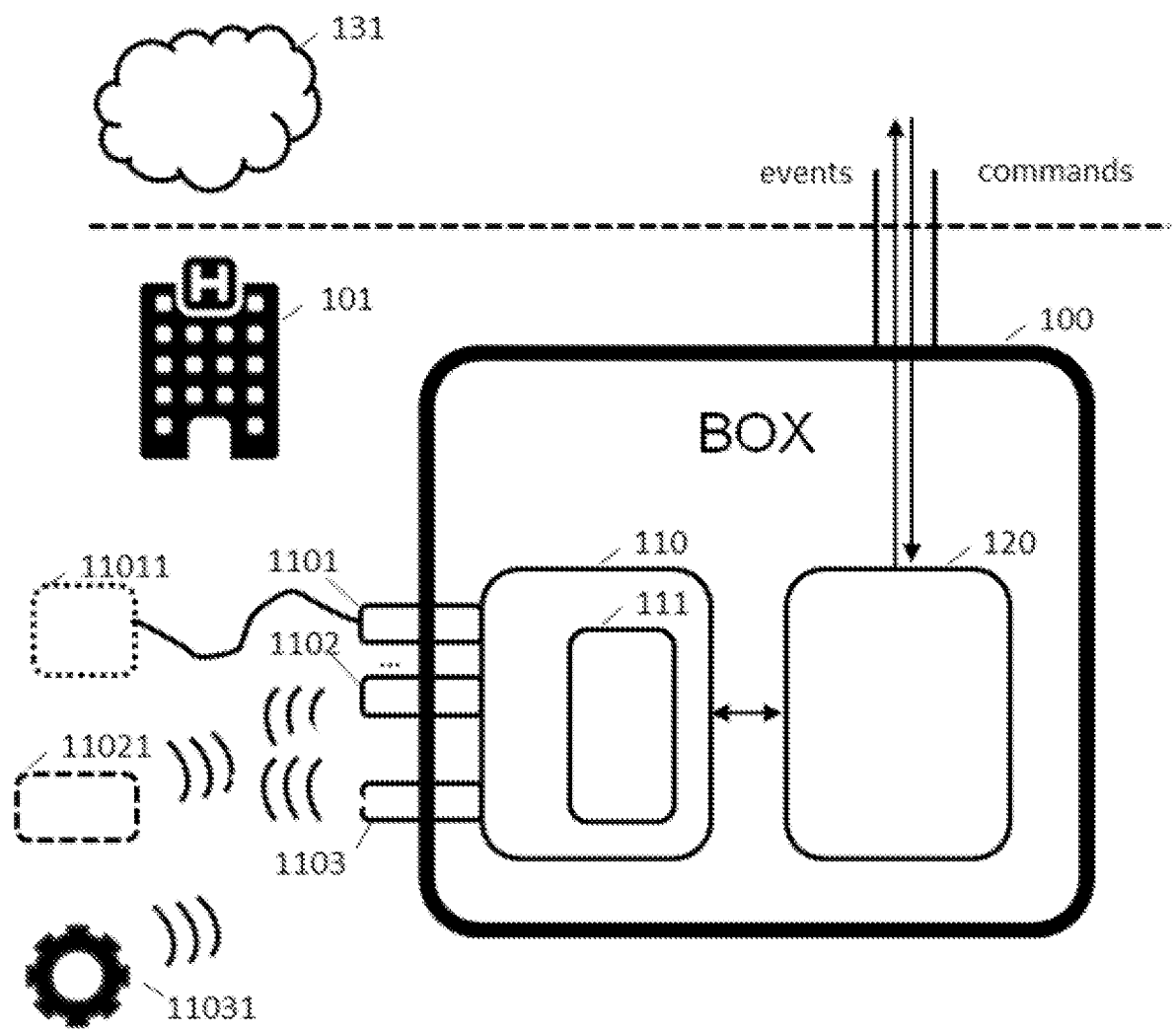
FIG. 1 shows one example of an embodiment of a system according to the invention (client-side perspective)

A "Property Management System" acronym PMS generally designates a standalone device. It can be used in hotels, motels, resorts, hospitals, apartment/townhouse complexes, restaurants, retirement centers, cruise ships, busses, airlines, shopping centers, passenger trains, casinos, etc. A PMS generally presents a limited number of communication interfaces which allow external guest service devices, hereinafter "local legacy systems" to access information stored within the PMS, by sending and receiving messages to and from the PMS via said communication interfaces. The PMS may also send notification messages to guest service devices via the communication interfaces. A serial port is often included as one of the interfaces to allow interconnection to a guest service device such as a controller of the above-described telephone system. A plurality of serial ports for connecting to multiple guest service devices may be included, for example, allowing simultaneous connections to a telephone system controller, an electronic door access controller, a minibar door access controller, a video-on-demand (VOD) controller, a high speed internet access (HSIA) controller, a pay-tv, etc. One or more network ports may also be included as communication interfaces in order to allow the PMS to communicate with any number of external guest service devices via a computer network.

More generally, a "management system" can be used wherever/whenever a plurality of local devices is present and requires a centralized (or decentralized) management. The scope of the invention thus encompasses management systems of any kind, not only to so called "PMS" systems, described above. Embodiments of the invention can be applied to the management of fleets of vehicles or drones, parking places, etc.

A "sensor" is an object or a device whose purpose is to detect events or changes in its environment, and then provide a corresponding output. A sensor presents deviations. If the sensor is not ideal, several types of deviations can be observed. In particular, noise is a random deviation of the signal that varies in time. A sensor according to embodiments of the invention can be one or more of a pressure sensor, ultrasonic sensor, humidity sensor, gas sensor, motion sensor, acceleration sensor or accelerometer, displacement sensor, force measurement sensor, gyro sensor or gyroscope, temperature sensor, image sensor, video sensor, U.V. sensor, magnetic sensor, CMOS image sensor, a silicon microphone, Inertial Measurement Unit (IMU), pressure sensor, micro-mirror, radiofrequency sensor, magnetic field sensor, digital compass, oscillator, lux meter or light sensor, proximity sensor, G.N.S.S. (e.g. G.P.S.), barometer sensor, Wi-Fi sensor, Bluetooth sensor, NFC sensor, pedometer, pulse oximetry sensor, heart rate sensor, fingerprint sensor . . . .

An "actuator" refers to a component which is responsible for moving and/or controlling a mechanism or system. An actuator requires a control signal and a source of energy. An actuator also can be a source of data (either directly or indirectly via a coupled sensor), which can be manipulated by embodiments of the invention (as data stemming from one or more sensors). An actuator is generally used with at least one sensor. In other words, a sensor can be excited by an actuator. An "actuator" according to the invention can be one of the elements selected in the group consisting of a motor (e.g. electric, piezoelectric, stepper), an autofocus actuator, a micro-speaker, a micro-mirror, an electro-active polymer, a servomechanism, a shape-memory alloy, a haptic component (e.g. vibratile), etc. Noticeably, actuators placed at one end of the control chain can be controlled by the cloud gateway and/or one or more servers in the cloud. In other words, bilateral communications between actuator(s), gateway(s) and cloud server(s) can occur.

A "cloud gateway" is a "client device", sometimes hereinafter referred to as "box", designates hardware and software according to embodiments of the invention. A hotel can comprise one or more boxes.

The term "Cloud" designates a plurality of (interconnected, generally cooperating) servers. A cloud server can be a physical entity, i.e. a real machine. In some embodiments, a cloud server can correspond to one or more virtual machines (i.e. decoupling of hardware and software). The expression "cloud server" can be replaced by "remotely accessed server".

"Local" and "distant" refer to relative words, from the client perspective (the one of the hardware gateway). Terms can be interverted (to obtain the Cloud's perspective). The use of both terms in all cases leaves no ambiguity with respect to (separation in) space. With respect to time, local client(s) and distant server(s) operate during the same timeframe, i.e. with transmission and processing delays (near real-time ranges).

"Functional messages" designate the "payload" of the messages, which is used in the Cloud. In other words, functional messages correspond to the substance, while form can be varied. Functional messages are interpreted (i.e. translated and executed) in and/or by the cloud, that is server-side.

Thus, processing is mostly, if not exclusively, performed in the Cloud (backend, orchestration of services). Advantageously, no configuration is required, in particular client-side (few computing power is required client-side). The handling of protocols and messages can be performed in the cloud (e.g. distant servers). Locally, the proposed solution is "plug-and-play", providing a "Swiss knife" (possibly reconfigurable) for physically connecting local legacy devices and handling data and/or programs in cloud.

There is disclosed a system for the management of local (legacy) devices (e.g. in a Property Management System for an hotel), said system comprising: one or more distant cloud servers, a distant cloud server providing a plurality of cloud services; a local cloud gateway interfacing with said local legacy devices, said local cloud gateway comprising: a housing comprising a plurality of interface connectors of different types, said interface connectors being configured to physically connect one or more local legacy devices to one or more distant cloud servers; said interface connectors comprising at least one serial RS232 connector; communication resources configured to exchange data to and from said legacy devices using said interface connectors, with said one or more distant cloud servers, using messages at an OSI layer inferior or equal to TCP/IP; processing resources configured to extract one or more functional messages from data received from each said interface connectors, said one or more functional messages being situated at an OSI layer inferior or equal to TCP/IP; wherein the local cloud gateway is configured to initiate a secure communication channel to communicate one or more extracted functional messages to one or more distant cloud servers; wherein a message protocol service executed in a distant cloud service is configured to receive and decode said one or more extracted functional messages communicated via the secured communication channel.

The term "legacy" should be interpreted in the broadest sense. It reminds of the fact that these local legacy devices are provided "as is", generally with old if not obsolete ports or technology (initial technical problem). The term also underlines that local devices are pre-existent and not modifiable. Embodiments of the invention have to cope with this installed base of devices (i.e. to interface them). The manipulated local legacy devices are generally not modifiable indeed. Yet, in some embodiments, some (more recent) legacy devices can be added to the whole system and as a result the managed base of devices can be "hybrid", comprising a large fraction of the local legacy devices which remain not modifiable, while at least one local device is modifiable (e.g. configurable in part). In such situations, said specific modifiable/configurable local device can be modified or configured.

In other words, communications between local legacy devices and the gateway are generally unilateral (from legacy devices to the gateway, which adapts to the traffic being received); but in some other situations, the communication with the gateway can be bilateral, at least to a certain extent. If the end local legacy device happens to be controllable at some point, then other schemes can be derived from those presently described. For example, if port configuration is enabled on one end legacy device, the gateway can interact with the modifiable legacy device and, for example, change on-the-fly port configuration. Many other parameters may thus be controlled or otherwise modified within a reconfigurable legacy device, via/by the gateway, via/by the Cloud. Developments around the determination and management of configuration files also can be sophisticated, with multi-tiered configuration files. The present description can be modified to handle "not modifiable or configurable local devices" along "modifiable or configurable local devices", instead of handling "legacy" devices.

In one embodiment, a distant cloud server is configured to provide: a message protocol management service to handle data communications to and from said plurality of local legacy devices; an orchestrator service to manage a plurality of local legacy devices or representations thereof; wherein a local legacy device amongst a plurality is identified by an orchestrator service executed in a distant server.

In one embodiment, the identified legacy device is configured to communicate directly to the orchestrator service using low level protocols.

In one embodiment, a message protocol service executed in a distant cloud server is configured to encode and communicate one or more functional messages to the local cloud gateway.

In one embodiment, one or more distant cloud servers are configured to process the one or more functional messages received from local legacy devices.

In one embodiment, one or more distant cloud servers are manageable via an administration interface accessible by Internet.

In one embodiment, a local cloud gateway is associated with a corresponding distant cloud gateway, or twin, hosted in a distant cloud server.

In one embodiment, the local cloud gateway further comprises a memory to cache data received and/or prefetched from the cloud, wherein at least one particular low level protocol requires a maximal amount of time for the provision of a response by said local cloud gateway.

In one embodiment, the local cloud gateway housing is expandable by the addition of a module comprising an interface connector of a different type.

In one embodiment, the system further comprises a piezoelectric transducer, said buzzer being configured to vibrate and emit error sound codes according to predefined corresponding sequences.

In one embodiment, the system further comprises a web server configured to serve at least one web page displaying the respective operational status of the requested services or wherein the different statuses of the services are displayable on a webpage retrieved from the network.

In one embodiment, a configuration file in two parts is determined from an expandable catalogue of low level protocol translators, wherein a first part of the configuration file is communicated to the local cloud gateway, said first part comprising a port number information used by the local legacy device, and a second part of the configuration file is communicated to a message protocol service executed in a distant cloud server.

The partitioning (or division with overlap) of the configuration file in several parts is advantageous: each piece of hardware along the chain receives necessary and sufficient information to cooperate with others. The possibly intensive computations are deported in the cloud, comprising elastic resources by construction, while the local cloud gateway gathers and manages necessary and sufficient information in the field. As results, response times are shortened, and the global system reactivity is improved. Flexibility is brought at minor cost, as local legacy devices got unified and remotely administrated.

In one embodiment, the system further comprises one or more local actuators.

In one embodiment, local legacy devices are associated with a property management system, in a hotel or a cruise ship or a hospital. In another embodiment, local devices are associated with a management system of a different type (management of fleets of vehicles, of an installed base of consoles, of fleets of drones, etc).

There is described a computer implemented method in a client device for accessing cloud-hosted services, comprising the steps of: connecting one or more local legacy devices to one or more interface connectors of different types of a local cloud gateway; said interface connectors comprising a TCP/IP port as an output; receiving data from said plurality of interface connectors of different types; extracting one or more functional messages from data received from each said interface connectors; communicating one or more functional messages to one or more distant servers. In an embodiment, said interface connectors comprise a serial RS232 connector as an input.

In one embodiment, functional messages are extracted by using an expandable catalogue of low-level protocols.

In one embodiment, communications are encrypted.

There is described a computer implemented method in a client device for accessing cloud-hosted services, comprising the steps of connecting one or more local legacy devices to one or more interface connectors of different types of a local cloud gateway; receiving data from said plurality of interface connectors of different types; extracting one or more functional messages from data received from each said interface connectors; and communicating one or more functional messages to one or more distant servers.

In one embodiment, the method further comprises the step of extracting functional messages by using an expandable catalogue of low-level protocols, and comprises the step of determining at least one configuration file associated with a local legacy device.

In one embodiment, the method further comprises the step of identifying a local legacy device and communicating a part of the corresponding configuration file to the local cloud gateway, said part comprising port number information used by the local legacy device.

In one embodiment, the method further comprises the step of communicating another part of the configuration file to a message protocol service executed in a distant cloud server.

In one embodiment, the method further comprises the steps of registering one or more local legacy devices against the local cloud gateway, by mapping local legacy devices onto said local cloud gateway ports; registering said local legacy devices against one or more cloud servers and booting up said local cloud gateway.

In one embodiment, the method further comprises the steps of receiving data from one or more cloud servers, said data comprising executable instructions; executing said executable instructions on said one or more local legacy devices.

There is disclosed a computer program comprising instructions for carrying out one or more steps of the method when said computer program is executed on a computer device.

FIG. 1 shows one example of an embodiment of a system according to the invention (client-side perspective).

A "box" (100) interacts with the cloud management system (130) in the Cloud (131). The box can be placed in a building (101), for example, in a hotel. In variants, the box can be placed in a motel, resort, hospital, apartment, restaurant, retirement center, cruise ship, bus, plane, shopping center, train, casino, etc. The physical device (100) comprises a local communication manager (110) which comprises a plurality of connectors (11011, 1102 and 1103).

Data is received from legacy systems (11011, 11021, 11031). A legacy system can be a telephone, an electronic door actuator, a minibar door actuator or access controller, a video-on-demand controller, a lighting controller, etc More generally, such a system can be any consumer electronics device (e.g. laptop, smart watch, virtual reality or augmented reality device, game console, television, etc) or any Internet of Things (IoT) device as well (for example smart meters in domotics; mechatronics components in automotive; medical devices or components in healthcare; elements for infrastructure e.g. smart city, transportation, logistics; banking devices in finance; etc)

Said legacy systems can comprise sensors and/or actuators. For example, an actuator (11031) can be connected to the interface connector 1103. Connections between interface connectors and connected systems can be wired, but some can be wireless e.g. 11021. For example, a serial-to-IP device can send data through Wi-Fi. Bluetooth or Li-Fi or any short-range communication interfaces can be used.

The low level protocols manager (111), configured in or in association with the box 100 handles said received data. Messages or payloads are then extracted from said data and communicated to the local communication manager (110).

Later on, the extracted payloads are sent to the cloud client manager (120), which in turn interacts with the cloud server manager (not shown, next figure).

In one embodiment, hardware requirements of the box are reduced to the minimal amount required, i.e. hardware connectivity and low-level protocols management.

In some embodiments, the box (edge) is more intelligent or "smart". For example, some time limits with respect to ack-nack exchanges can advantageously be managed via specific memory or buffer units. Other embodiments are possible (from immediate forward, to store-and-forward models, wherein data can be temporarily stored in local storage in the event that communication between the cloud gateway and the cloud platform is disrupted).

In an embodiment, the box or local cloud gateway housing is expandable by the addition of a module comprising an interface connector of a different type. In an embodiment, the client device further comprises lights arranged on the housing, configured to display the respective operational status of the requested services. For example, next to each interface, green or red LEDs can confirm or infirm the operational state of the service addressed by the interface. Various embodiments are possible. A blinking green light can mean that the connection to the Cloud is operative but that the corresponding service is not yet active.

In an embodiment, the box or local cloud gateway housing comprises a piezoelectric transducer, said buzzer being configured to vibrate and emit error sound codes according to predefined corresponding sequences. In the absence of a display indeed, the vibrating unit of the box can be opportunistically leveraged. In an embodiment, the housing of the device further comprises a help button, a triggering of said button establishing a phone call for support.

In an embodiment, the box further comprises a web server configured to serve at least one web page displaying the respective operational status of the requested services.

In an embodiment, the different statuses of the services are displayable on a webpage retrieved from the network. A mobile phone for example can access the webpage, for example of the same Wi-Fi network. In variants, the web page can be projected onto a desk or wall. In other variants, the web page is displayed by or within augmented reality and/or virtual reality. In an embodiment, the client device is being configured to exchange data from one or more servers hosted in the Cloud, said servers hosting an expandable catalogue of low-level protocol translators to decode/encode data communicated by the client device.

In an embodiment, the box (100), e.g. cloud client manager (120) or entity (110) or else, can comprise an expandable catalogue of "protocol translators" to encode and/or decode messages.

A finite set of low-level protocols can be used to encapsulate device data (similar to an "envelop"), allowing extraction and transfer of the functional message itself (payload) to the cloud for translation. Examples of payload extraction are provided hereinafter.

Figure 2:
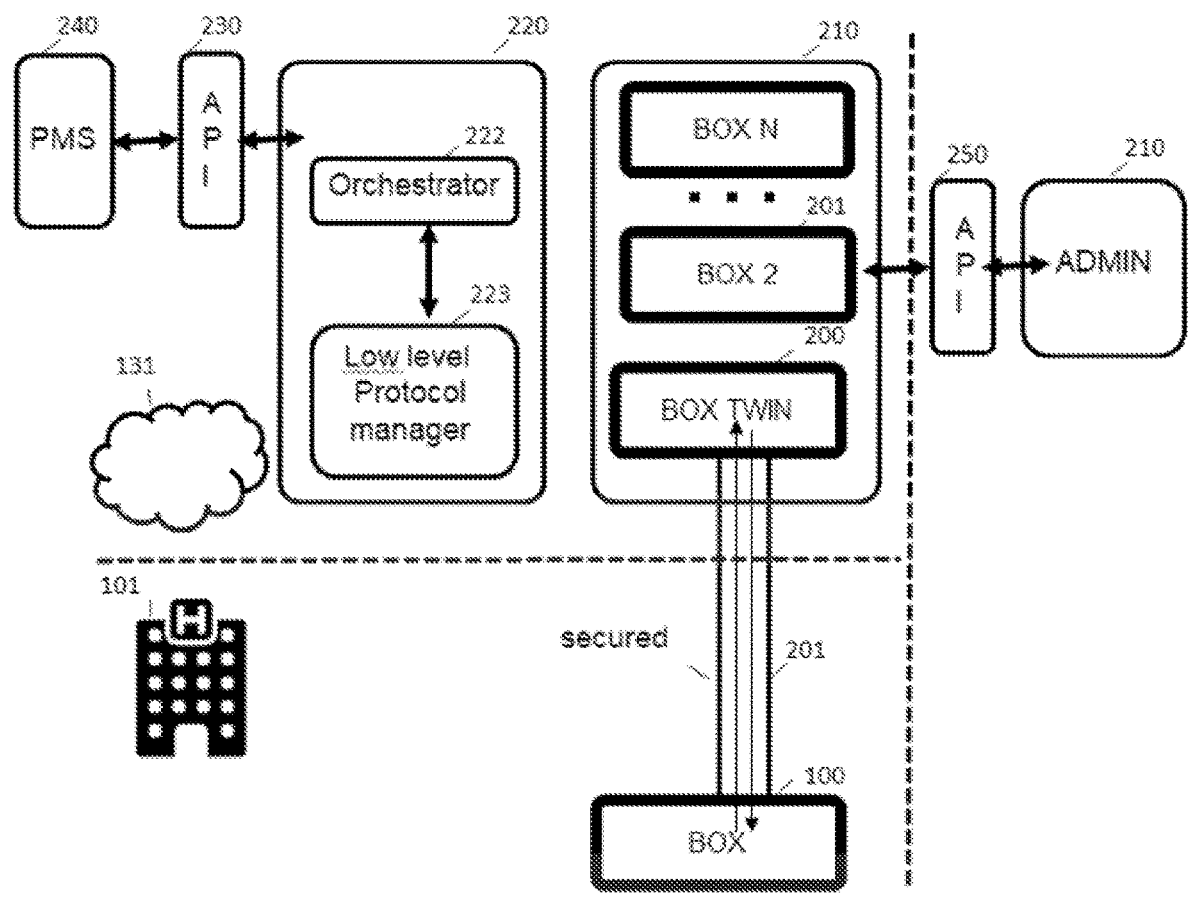
FIG. 2 shows one example of an embodiment of a system according to the invention (server-side perspective)

FIG. 2 shows one example of an embodiment of a system according to the invention (server-side perspective).

The cloud server manager (220) can interact with a plurality of "twins" (210). A "twin" e.g. (201) is the representation of a box in the Cloud, comprising information about its physical/or logical properties (status, conditions, activity, etc). It can represent a virtual logical copy of a box (100). It encompasses IT of parameters associated with the box (e.g. status of services, components and associated states, temperature, environmental conditions, etc). The "twin" representation is accessible and manipulatable even when the corresponding box is offline. Advantageously, this allows simulating or otherwise anticipating changes brought to the box. A collection of twins corresponding to a respective plurality of boxes can thus be managed remotely.

With respect to computer security, most of legacy devices are using unencrypted/unauthenticated connections with the gateway (RS232, TCP-IP), as per their native protocols. Many of these legacy systems are obsolete, some vendors do even not exist anymore, but hotels might keep them for years. As a consequence, the local network is considered as unsecured.

In some embodiments of the invention, the outgoing traffic e.g. out of the box (100) is encrypted (201). Ciphering can be sophisticated further (e.g. priori obfuscation, hardened code, steganography in video frames, etc). While local hacking in theory remains possible, remote hacking (i.e. after data leaves the hotel) is impeded or at least slowed down.

In an embodiment, for example at startup, the box retrieves a configuration (for example via a configuration file) and establishes a secured channel, which can be used for bidirectional communications.

Server-side, a plurality of corresponding boxes or "twins" 210 is maintained or hosted. A twin (200, 201 . . . ) is the representation of one gateway (in a hotel) in the cloud, comprising information (e.g. reported properties) about its status and activity, advantageously (even) accessible when a box is offline.

The use of APIs (Application Programming Interfaces) enables the decoupling of services of the architecture. For example, the existence of APIs 230 allows the described systems and methods to be interoperable with virtually any type of PMS (240). APIs (250) expose methods (210) to manage the plurality of twins, i.e. virtual and always-on representations of the installed base of gateways. This can allow third-party management, in part or entirely. APIs abstractions allow for seamless integration, better controlled points and independent updates.

Via these APIs (230), a given PMS can be operated by logic (220), i.e. software code which comprises or rules an orchestrator (222) in association with a low-levels protocols manager (223). An administration logic (210) identifies rules and manages the plurality of twins.

Figure 3:
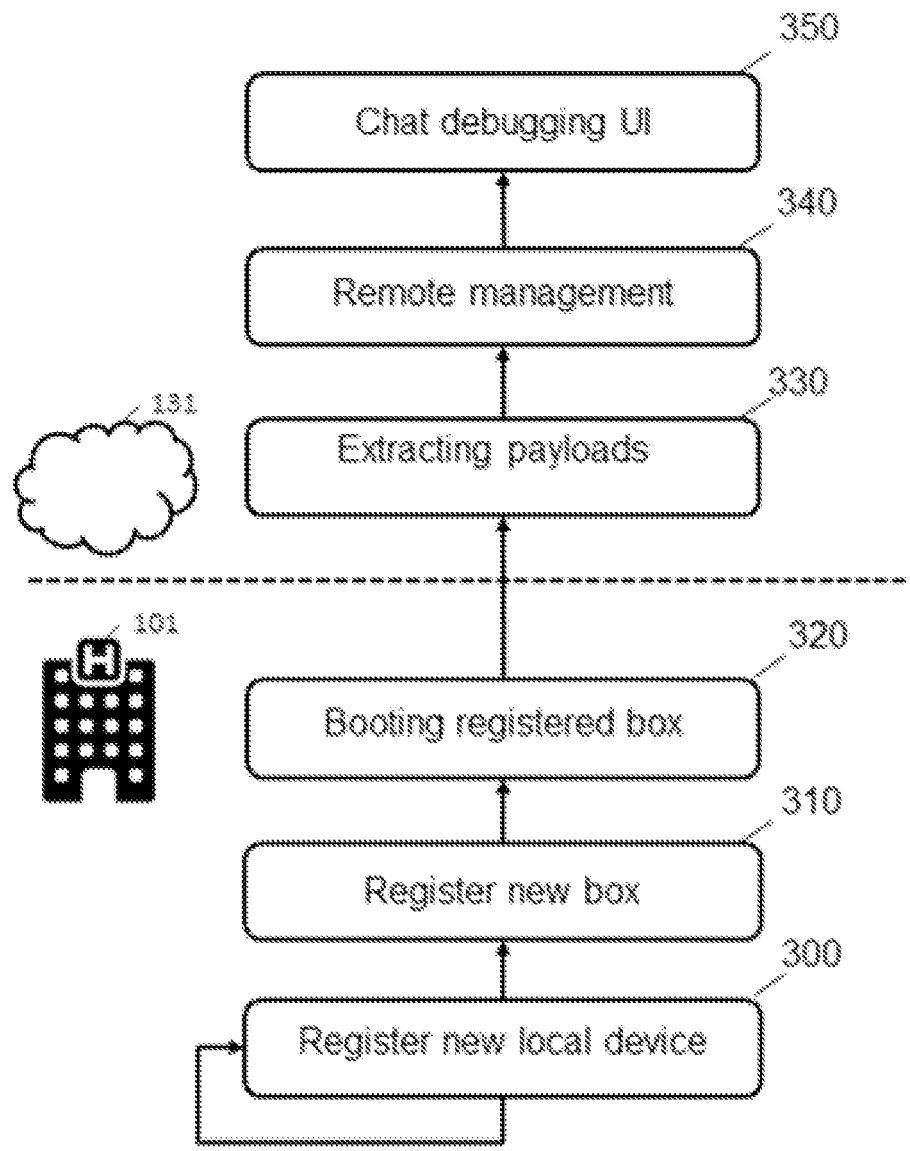
FIG. 3 shows examples of steps on an embodiment of the method according to the invention.

FIG. 3 shows examples of steps on an embodiment of the method according to the invention.

In an embodiment, the method according to the invention comprises a step of registering (300) one or more local devices (e.g. a Keycard, a POS, a telephony system). A local device is modeled using a set of generic capabilities i.e. operations (manage Keycard, post-charge on a guest folio, retrieve guest info, etc). Supporting a new device means creating a new translator, selecting the generic capabilities it is offering, and writing only specific code to map generic commands with specific protocol sequences, and configuring which low level protocol(s) the device is supporting to encapsulate (with default settings).

In an embodiment, the method comprises a step of registering (310) a new box on the cloud. For example, using a box Administration Portal, a given box is assigned to a hotel, and local devices to work with (picked up from existing catalogue) are mapped to Box serial or TCP-IP ports. For example, Keycard number 17 on RS232 Port 1, POS number 59 on TCP-IP Port 6, etc.

In an embodiment, the method comprises a step of booting (320) the registered box. The box for example connects to a configuration endpoint, identifies itself to retrieve its configuration file built during a previous step. For example, the step of using a low-level ETX-STX protocol on Port1, and CRLF on Port 6.

Various security models are envisioned. In an embodiment, no credentials are required (e.g. no IoT Hub endpoint address): only the configuration endpoint is needed. Once connected, the box identifies itself using both public (Mac Address) and private (hardware related) keys. An encrypted box configuration file retrieved from the Cloud comprises the IoT Hub address to use (DEV, QA, and PRD) and the connection credentials. During initial registration process (i.e. when configuring and assigning a registered box to a registered hotel), the underlying Operating System password can be customized.

In an embodiment, in running mode, when receiving data via a specific port, the box will use the configured low-level protocol to extract (330) the message payload from raw data. In an embodiment, a header can be added to the extracted payload, for example to later enable the cloud translation engine to select the right translator (Box ID, Port number). Further on, the message can be send to the cloud for translation and action (e.g. with TLS 1.2 encryption).

In an embodiment, extracted payloads can be encapsulated along additional meta data (e.g. ID of box, ID port, time stamping, etc).

In an embodiment, one or more boxes can be remotely managed (340). For example, an administration portal can allow the remote administration of one or more boxes (e.g. activation, configuration, and deactivation) and monitoring (e.g. exceptions, status).

In an embodiment, the cloud gateway can allow a messaging interface (350), for example in real-time, to show messages communication messages between a given box and the cloud. The messaging interface can take the form of a chat interface, displaying the various steps of communications. This advantageously improves debugging.

Other embodiments are described hereinafter. When starting, a Box connects to the configuration endpoint (only known URL). If not registered (e.g. first time connection), the considered box sends a registration request and waits for an operator to a) review the list of boxes pending registration, b) approve or reject box's request, and c) create configuration (assigned Hotel, System Devices, Ports, Protocols). If already registered, the box gets encrypted configuration containing IoT Hub endpoint and connection keys (generated during registration from box identifiers), generates connection token valid for a limited time (e.g. 24 h), connects to Cloud IoT Hub (e.g. Azure)

Regarding the Cloud (IoT Hub), the configuration endpoint (in https) handles authentication using Box ID, Firmware version, hash from HW private key. A returned AES encrypted configuration contains system devices and protocol information, but also IoT Hub endpoint to connect to (Test, Prod, . . . ) along associated credentials. In one embodiment, no IoT Hub endpoint/credentials are stored in the box.

Regarding the IoT Hub platform, in some embodiments, TLS 1.2 (and subsequent versions) connections can be used. Authentication may use token valid for limited amount of time. Full traceability on all login events can be ensured.

Regarding the filtering of messages, at Box level, to be processed, a message arriving on a specific Box port must use a valid low level protocol sequence for the system device configured for that port. In an embodiment, any exception can be logged and ignored. In the Cloud, in an embodiment, only IoT Hub messages containing valid Device Messages can be accepted. In an embodiment, any exception can be logged and ignored.

Device messages can contain only functional messages (i.e. device protocol encoded data) linked to the specific system device connected to a specific port (as per the box configuration), restricting the potential attack perimeter or surface. In an embodiment, any exception can be logged and ignored.

In an embodiment, the system devices catalogue can be expanded. Multiple device types can be supported (e.g. Keycard, Pay-Tv, POS, PBX, Energy, etc). Sub-systems interactions (system devices, gateway box, PMS) can be performed through well-defined integration points. Separating functional data (i.e. device data) and monitoring/management flows, can enable traffic prioritisation. Loosely coupling of cloud systems, box hardware and PMS enables different lifecycles: e.g. supporting additional system Devices doesn't impact the PMS (for example).

Example of a Gateway Box Configuration

To connect, a box can be first provisioned and configured through an administration tool. A gateway box firmware can only contain the configuration endpoint address (HTTPS service). When the considered box starts, it connects to the configuration endpoint to retrieve its configuration by passing identifiers linked to hardware and its firmware version. If already registered, the considered box gets an encrypted configuration containing IoTHub endpoint and connection keys (generated during registration from box identifiers). A connection token valid for a limited time (e.g. 24 h) can then be generated using connection keys, and connection is established with the Azure IoT Hub. If not registered (e.g. first connection), the box can send a registration request with its identifier and a hash code generated from a unique internal hardware key. In one embodiment, a human operator can review the list of boxes pending registration, to approve and configure them (e.g. which hotel the box is assigned to, which type of system device is connected on which port, and with which protocol).

Figure 4:
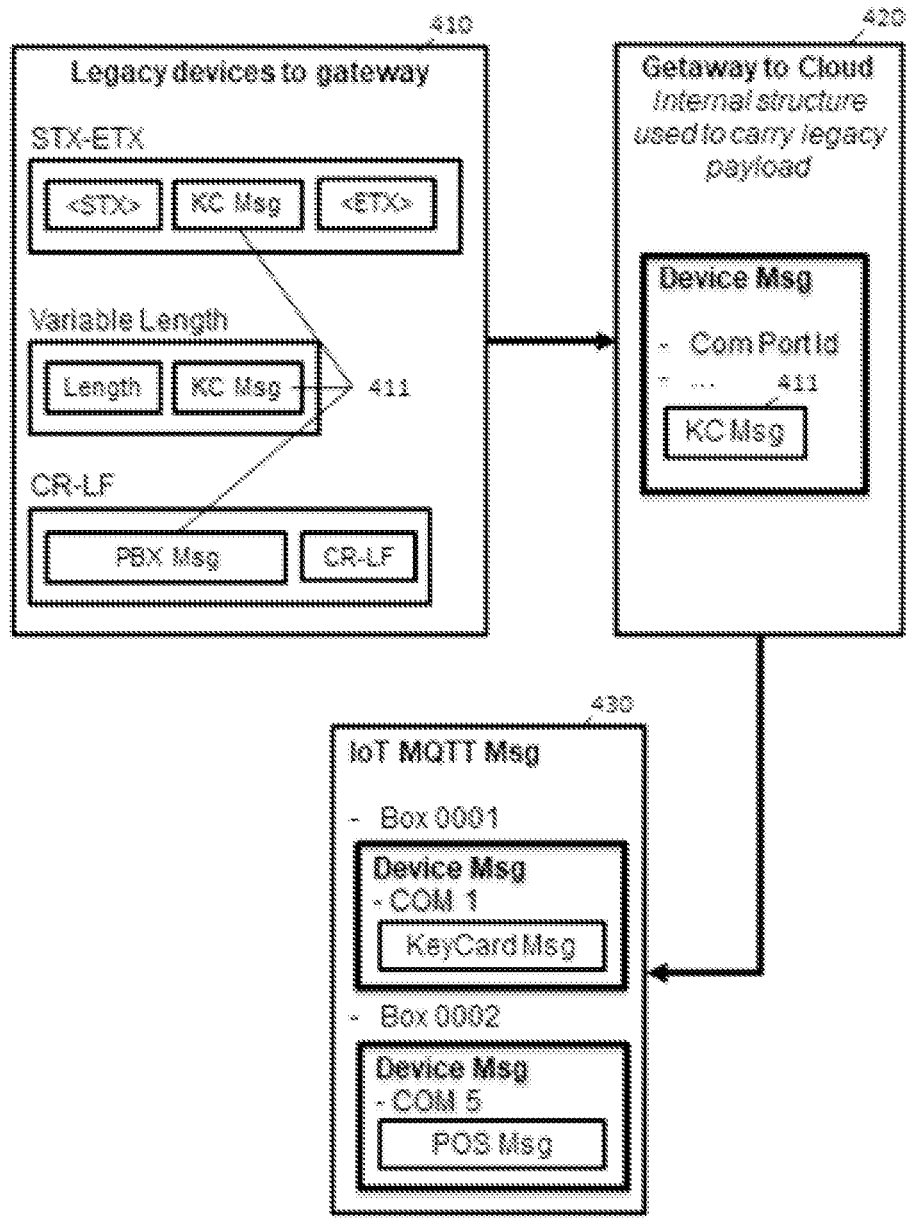
FIG. 4 illustrates the step of extracting functional messages from legacy devices.

FIG. 4 illustrates the step of extracting functional messages from legacy devices.

The figure show different initial messages (410) stemming from legacy devices. These messages come in different forms (formats, syntax, with specific prefix, suffix, tags, etc). The "payload" (substance or functional meaning) of a given message can be identified and later isolated or extracted.

FIG. 4 illustrates the step of extracting a functional message from an incoming device message. The figures shows the same operation (creation of a keycard in a hotel), represented in/by two different legacy devices.

First String of Characters:
"A\u001ER101\u001ETGUEST\ u001EFEmma\u001E-NZebar\u001EUGUEST \u001E17C1"

Second String of Characters:
"0399G|R101|NZebar|D201707200000|O201707221 400|C1|"

The gateway box can re-encapsulate the payload, for example in a message 420, along with the device communication port ID. Encapsulated messages can be gathered in the Cloud (430)

Different message formats may involve different message sizes, data fields, authentications, encoding techniques, compression, message segmentation, acknowledgements, checksums, begin/end tags, etc.

The low-level protocols management thus comprises corresponding lists of characters strings, tags, special characters, lengths of messages, etc which can be used to normalize incoming data flows, that is extract the substance of a received message, whatever the form of the message.

The disclosed methods can take form of an entirely hardware embodiment (e.g. FPGA), an entirely software embodiment or an embodiment containing both hardware and software elements. Software embodiments include but are not limited to firmware, resident software, microcode, etc. The invention can take the form of a computer program product accessible from a computer-usable or computer-readable medium providing program code for use by or in connection with a computer or any instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

The invention claimed is:

1. A system for managing local legacy devices, the system comprising:
   one or more distant cloud servers providing a plurality of cloud services;
   a local cloud gateway interfacing with one or more local legacy devices, the local cloud gateway comprising:
      a housing comprising a plurality of interface connectors of different types, the interface connectors being configured to physically connect one or more of the local legacy devices to the one or more distant cloud servers;
      communication resources configured to exchange data to and from the one or more local legacy devices using the interface connectors, with the one or more distant cloud servers, using messages at an OSI layer inferior or equal to TCP/IP;
      processing resources configured to extract one or more functional messages from data received from each interface connector, the one or more functional messages being situated at an OSI layer inferior or equal to TCP/IP; and
      a piezoelectric transducer supported by the housing, the piezoelectric transducer configured to generate audible sound in response to detection of an error at the local cloud gateway;
   wherein the local cloud gateway is configured to initiate a secure communication channel to communicate one or more extracted functional messages to the one or more distant cloud servers; and
   wherein a message protocol service executed in at least one of the cloud services is configured to receive and decode the one or more extracted functional messages communicated via the secure communication channel.

2. The system of claim 1, wherein each distant cloud server is configured to provide:
   a message protocol management service to handle data communications to and from the local legacy devices; and
   an orchestrator service to manage the local legacy devices or representations thereof;
   wherein a local legacy device amongst a plurality is identified by the orchestrator service.

3. The system of claim 2, wherein the identified legacy device is configured to communicate directly to the orchestrator service using low level protocols.

4. The system of claim 1, wherein a message protocol service executed in the one or more distant cloud servers is configured to encode and communicate one or more functional messages to the local cloud gateway.

5. The system claim 1, wherein the one or more distant cloud servers are configured to process the one or more functional messages received from the local legacy devices.

6. The system of claim 1, wherein the one or more distant cloud servers are manageable via an administration interface accessible by Internet.

7. The system of claim 1, wherein the local cloud gateway is associated with a corresponding distant cloud gateway hosted in the one or more distant cloud servers.

8. The system of claim 1, wherein the local cloud gateway further comprises a memory to cache data obtained from the one or more distant cloud servers, and wherein at least one particular low level protocol requires a maximal amount of time for the provision of a response by said local cloud gateway.

9. The system of claim 1, wherein the local cloud gateway housing is expandable by the addition of a module comprising an interface connector of a different type.

10. The system of claim 1, further comprising a web server configured to serve at least one web page displaying the respective operational status of the requested services or wherein the different statuses of the services are displayable on a webpage retrieved from the network.

11. The system of claim 1, wherein a configuration file in multiple parts is determined from an expandable catalogue of low level protocol translators.

12. The system of claim 11, wherein a part of the configuration file is communicated to the local cloud gateway, said part comprising a port identifier used by the local legacy device.

13. The system of claim 11, wherein another part of the configuration the is communicated to a message protocol service executed in a distant cloud server.

14. The system of claim 1, further comprising one or more local actuators.

15. The system of claim 1, said interface connectors comprising at least one serial RS232 connector.

16. The system of claim 1, wherein local legacy devices are associated with a property management system, used in one or more of an hotel, motel, resort, hospital, apartment/townhouse complex, restaurant, retirement center, cruise ship, bus, airline, shopping center, passenger train, or casino.

* * * * *